A. M. STANLEY.
GAS MAKING APPARATUS.
APPLICATION FILED AUG. 31, 1910.
1,177,904.
Patented Apr. 4, 1916.
2 SHEETS—SHEET 1.
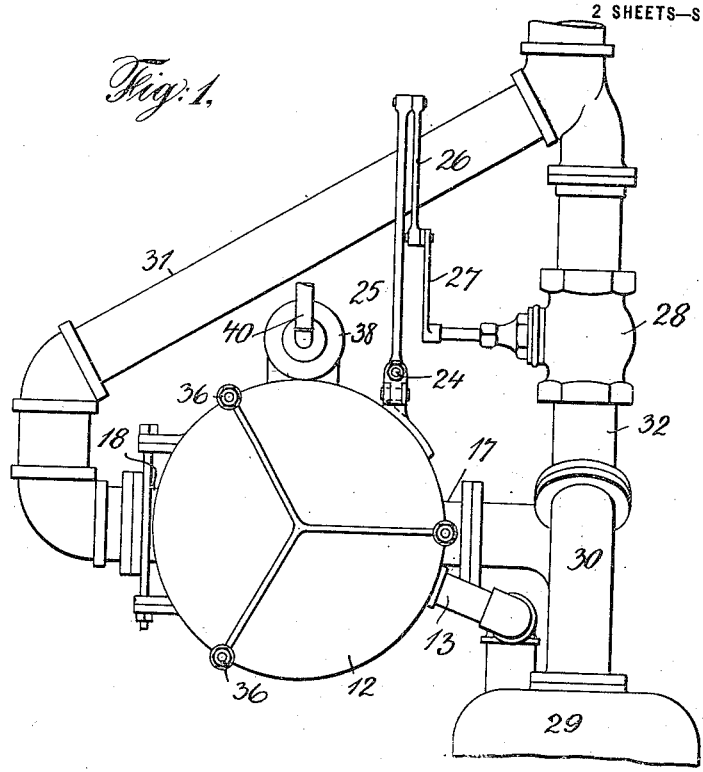
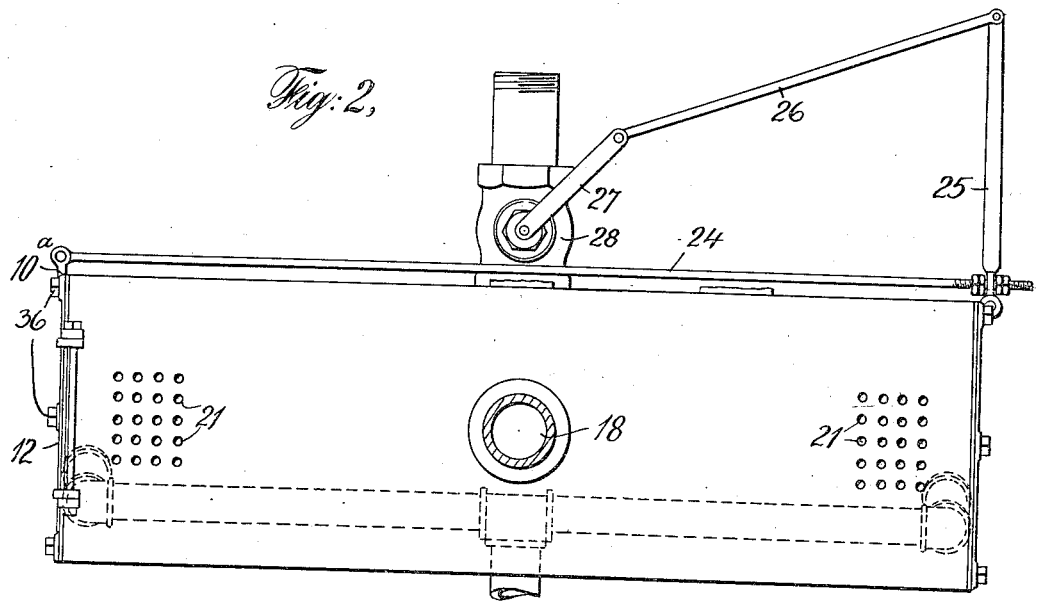

A. M. STANLEY.
GAS MAKING APPARATUS.
APPLICATION FILED AUG. 31, 1910.
1,177,904.
Patented Apr. 4, 1916.
2 SHEETS—SHEET 2.
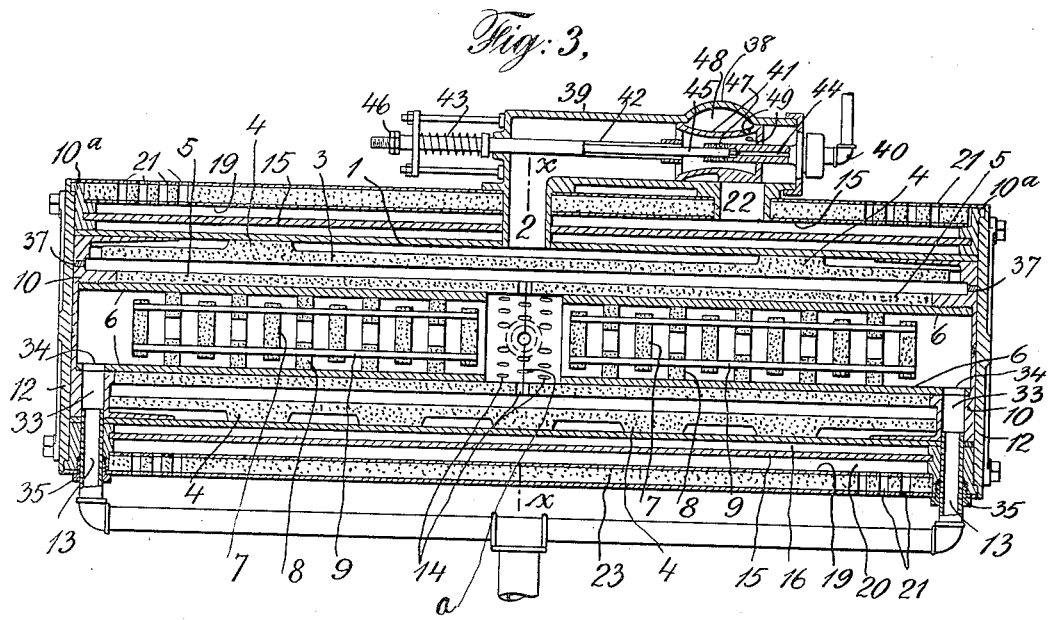
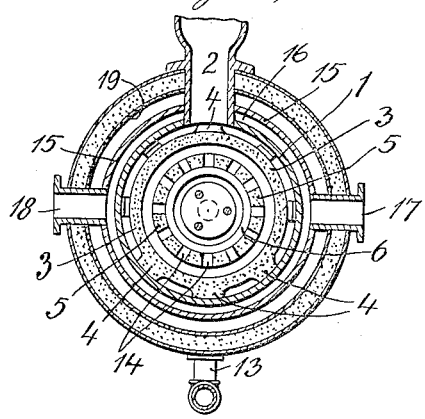
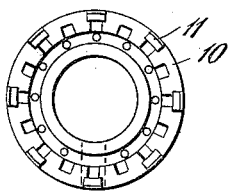
Witnesses:
Max B. A. Doring.
Paul H. Frank
Inventor
Arthur M. Stanley
By his Attorneys

UNITED STATES PATENT OFFICE.

ARTHUR M. STANLEY, OF LYNN, MASSACHUSETTS, ASSIGNOR TO HYDROCARBON CONVERTER COMPANY, OF NEW YORK, N. Y., A CORPORATION OF DELAWARE.

GAS-MAKING APPARATUS.

1,177,904. Specification of Letters Patent. Patented Apr. 4, 1916.

Application filed August 31, 1910. Serial No. 579,851.

*To all whom it may concern:*

Be it known that I, ARTHUR M. STANLEY, citizen of the United States of America, and a resident of Lynn, county of Essex and State of Massachusetts, have invented certain new and useful Improvements in Gas-Making Apparatus, of which the following is a specification.

My invention relates to the gasification of hydrocarbon oils, particularly crude oils, "scalped oils" distillate, fuel oil, and the like, and to apparatus therefor, which apparatus is of the general type illustrated and described in the patent of E. B. Benham No. 1,000,768, dated August 15, 1911.

My invention comprises automatic means for regulating the action of the gas making apparatus, (which apparatus is commonly termed a converter, and will be so termed herein), an improved structure of converter; and various other features hereinafter described and particularly pointed out in the claims.

The objects of my invention are to regulate automatically the temperature of the converter, to prevent the temperature in the converter from rising too high, and to improve, simplify and cheapen the construction of the converter.

I will now proceed to describe my invention with reference to the accompanying drawings, and will then point out the novel features in claims.

In the drawings: Figure 1 shows an end elevation of the improved converter and, in connection therewith, piping such as may be used in connection with the converter, when the latter is attached to a gas engine; Fig. 2 shows a side view of the converter; Fig. 3 is a central longitudinal section of the converter; Fig. 4 is a transverse section thereof on the line *x—x* of Fig. 3; Fig. 5 is a elevation of one of the end plates 10 of the apparatus.

Considering first the structure of the converter, and referring first to Figs. 3, 4 and 5. 1 designates a cylindrical casing constituting the main shell of the converter and provided with an inlet connection 2 for a mixture of air and oil, which mixture is converted into gas within the converter, as hereinafter described.

3 designates a cylinder of porous refractory material of an earthy nature, such for example as earthenware, crucible material, etc., located within cylinder 1 and spaced away from the walls thereof by means of lugs 4, formed at intervals upon the surface of cylinder 3.

5 designates another cylinder of porous refractory material, usually the same material as that of which cylinder 3 is formed, said cylinder 5 being located within cylinder 3, and, customarily, being formed in two sections, longitudinally, as shown. 6, 6 designate metal tubes projecting from the ends of the converter inward and which support the cylinder 5. Within these tubes 6 are baffles consisting of disks 7 alternated with rings 8, the disks supported by rods 9.

The ends of cylinder 1 are closed by end plates 10, secured to tubes 6, and so supporting them, said plates 10 being preferably provided with somewhat extended fingers 11, fitting within the main shell 6, whereby a firm support is provided for these end plates and the tubes 6 carried thereby. Outer end plates 12 are provided and, near the ends of the converter, discharge connections 13 are provided. Suitable openings 14 are provided in tube 5 near the center thereof, whereby the gas may pass into the interior of tubes 6.

The cylinder 1 is surrounded by another cylinder, 15, inclosing, around cylinder 1, a jacket space 16, through which heating gases, such as the exhaust gases of a gas engine, may be circulated; an inlet connection 17 and discharge connection 18 being provided. Another cylinder, 19, surrounds jacket cylinder 15, the jacket space 20 inclosed between cylinders 19 and 15 constituting an air heating space; suitable admission openings 21 to this space being provided, and a suitable discharge connection 22 being also provided. Finally, the converter is surrounded with a suitable lagging 23. Cylinder 15 is welded at its ends, into rings 10$^a$ surrounding the ends of cylinder 1, and welded to or otherwise secured to cylinder 1; and cylinder 19 fits, at its ends, over shoulders formed on rings 10$^a$, and is thereby supported and spaced away from cylinder 15.

The operation of the converter so far as the making of gas is concerned, is as follows: The converter having previously been heated up by the circulation of hot gases, such as hot exhaust gases, through jacket 16, a mixture of air and oil is admitted through supply duct 2 and ignites within the passages of the converter, combustion however being incomplete. It has been found in apparatus of the type of the Benham patent No. 1,000,768 referred to, that the form and construction of the parts, the extent of area of porous material, the freedom of the passages and the construction of such passages in such manner that the entering stream of oil and air is in the first place caused to impinge upon heated porous material of low heat conductivity, are all important features to be observed in the design and construction of such apparatus. In the apparatus herein shown, the stream of oil and air entering at 2 impinges in the first instance upon the cylinder 3, which is highly heated by the partial combustion going on in the passage between said cylinder 3 and cylinder 5, and by the circulation of the hot products of combustion through such passage. It is believed that the oil enters the pores of the porous material of which cylinder 3 is formed, where it so impinges upon said cylinder, and then escapes through the pores of such cylinder 3, as a gas or vapor. Whatever be the nature of the action which takes place, an intimate mixture of air and hydrocarbon vapor or gas is formed which, during or before partial combustion, passes around the ends of cylinder 3 into the space between cylinders 3 and 5, and thence through the openings 14 into tubes 6 and past the baffles thereof to the discharge connections 13. These baffles are customarily of the same material as the cylinders 3 and 5. The partial combustion going on within the converter maintains a high temperature therein such that a fixed gas is formed without deposition of tar, carbon or the like.

In the operation of large converters such as herein shown, it has been found that the converter tends in time to become too hot, because of excessive generation of heat within it; and it has been found that when such is the case, restriction in supply of exhaust gases or like heating gases to the heating jacket 16, obviates this trouble, so much so that by regulation of the supply of gases to jacket 16, the temperature of the converter may be maintained practically constant after it is once in operation. To this end I provide a thermostat, of which one member is the converter itself, the other member being a rod 24 (Figs. 1 and 2) secured at one end to one of the end rings 10ª of the converter, and connected at the other end to a pivoted multiplying lever 25, pivoted to the other end of ring 10ª of the converter, and itself connected by a link 26 to the operating lever 27 of a valve 28, in a by-pass connection of the pipe supplying heating gas to the converter.

In Fig. 1, which shows the general arrangement of a converter in connection with a gas engine, 29 designates the head of the cylinder of a gas engine, and 30 indicates the exhaust pipe of the engine connected to the inlet connection 17 of the jacket 16. The exhaust gases are conveyed away from the discharge connection 18 of the jacket 16 by a pipe 31, and a by-pass connection 32 is provided in which the valve 28 is located. According as this valve 28 is open to a greater or less extent, the flow of exhaust gases into the heating jacket of the converter will be less or greater, and since the expansion of the converter as a whole, relative to that of the rod 24 (the temperature of which rod will vary but little during the operation of the apparatus, while the temperature of the main cylinder of the converter will vary in substantial accordance with variation of temperature in the gas passages within it) regulates the opening of the valve 28, the structure thus described constitutes an automatic thermostatic device for regulating the temperature of the converter by opening or closing valve 28, more or less, according to the temperature obtaining within the converter.

The fuel supply inlet connection 2 of the converter is a nipple welded into openings in cylinders 1 and 15. The end ring 10ª at the left hand end of the converter (the ring to which the thermostatic rod 24 is secured) is likewise electrically welded or otherwise suitably secured to the cylinders 1 and 15. The inlet and outlet connections, 17 and 18, for the exhaust gases or other heating gases, are welded into openings in cylinder 15. The gas discharge connections 13 are pipes fitting within bores formed in rings 10ª, the ends of these connections 13 extending into passages 33, formed in end pieces 10, which passages communicate through registering openings 34 near the ends of pipes 6, with the interior of said pipes. Stuffing glands 35 are provided to make tight joints around pipes 13. The end plates 12 of the converter are hinged to the body of the converter, as shown particularly in Fig. 1, and are held in place by suitable screw studs 36. The end construction of the converter is such, as will be seen, that by unscrewing these studs, the end plates 12 may be swung to one side, thereby exposing the end pieces 10; and then, if desired, these end pieces may be pulled out (the pipes 13 being first pulled out) each end piece 10, when so pulled out, carrying with it the corresponding half length tube 6 and the half length porous cylinder 5 mounted thereon; also the baffles 7 and 8 mounted within such half length tube 6. This construction permits very easy access to the interior of the converter, the porous cylinder 5 being at the same time protected against injury if drawn out.

To permit inspection of the interior gas passages of the converter, without the necessity of withdrawing the tubes thereof, sight openings 37 (normally closed by suitable plugs, as shown) are provided. By swinging back one of the end plates 12 and removing the plugs 37 in the sight openings at the corresponding end of the converter, the interiors of tubes 3 and 5 may be seen. It is thus possible to inspect the interior of the converter while the parts are still hot, and, if desired, to remove the porous cylinders, or one of them, while still hot.

Preferably, the mixture of oil and heated air is supplied to the converter through an automatic mixing valve which regulates the supply of oil and of air in accordance with the demand on the converter. For this purpose I have shown a valve 38, the particular valve shown being of my invention and forming the subject matter of an application for Letters Patent filed April 8, 1910, Sr. No. 554,200. The said valve comprises a valve casing 39 having near one end a port connected to the air inlet 22 of the converter, and having at its other end a port connected to the supply connection 2 of the converter; and having also an oil supply connection 40. Within this valve casing there is a sliding piston valve 41, arranged to move longitudinally of the valve casing, across the air inlet port thereof; and this valve 41 is connected to a hollow valve stem 42 passing through a suitable guide in the left hand end of the valve casing and provided outside of the valve casing, with a spring 43 tending to keep the valve 41 in a nearly closed position. At its right hand end, and communicating with the oil supply connection 40, the valve has an oil admission duct 44 the outlet of which is restricted more or less by a needle valve 45, the stem of which is within the main valve stem 42 and is operatively connected to said stem 42, at its outer end, by screw nuts 46, whereby the opening of the needle valve with reference to the main valve, may be regulated. The oil supply duct 44 is provided with a plurality of ports 47 and the stem of the needle valve constitutes a piston arranged to travel over the orifices of these ports, so as to open one or more of the said ports, according to the adjustment of said needle valve. Air entering the valve casing through connection 22, enters a chamber 48 and thence passes through ports 49 of the valve 41 into the interior of said valve, picking up oil from the orifices of ports 47, and carrying such oil into the supply connection 2 of the converter. It will be seen that the action of this valve is such that, with increase of suction on the converter, the sliding valve 41 moves to the left, opening both the air port and the oil ports more widely, and with decrease of suction on the converter, the sliding valve 41 moves to the right, decreasing the effective opening of the air and oil ports.

I do not limit myself to the use of this particular mixing valve in connection with the converter herein described, and similar converters, but consider said valve especially applicable to converters such as this.

What I claim is:—

1. Gas producing apparatus comprising a casing having an opening at one end and a closure for such opening, and having a fuel and air inlet and a gas outlet at other points, means for heating the interior of said casing, and a gasifying body of porous combustion-promoting material within said casing and along which the fuel, and gas formed therefrom, will pass in passing from said inlet to said outlet, said gasifying body removable through the opening at the end of said casing.

2. Gas producing apparatus comprising a casing having an opening at one end and a closure for such opening, and having a fuel and air inlet and a gas outlet at other points, means for heating the interior of said casing, and a plurality of gasifying bodies of porous combustion-promoting material, within said casing and located one within another, forming, with said casing, a zigzag passage through which the fuel, and gas formed therefrom, will pass in passing from said inlet to said outlet, said gasifying bodies removable through the opening at the end of the casing.

3. Gas producing apparatus comprising a casing having an opening at one end and a closure for such opening, and having a fuel and air inlet and a gas outlet at other points, means for heating the interior of said casing, and a silicious gasifying body within said casing and along which the fuel, and gas formed therefrom, will pass in passing from said inlet to said outlet, said gasifying body removable through the opening at the end of said casing.

4. Gas producing apparatus comprising a casing having an opening at one end and a closure for such opening, and having a fuel and air inlet and a gas outlet at other points, means for heating the interior of said casing, and a plurality of silicious gasifying bodies, within said casing and located one within another, forming, with said casing, a zigzag passage through which the fuel, and gas formed therefrom, will pass in passing from said inlet to said outlet, said gasifying bodies removable through the opening at the end of the casing.

5. Gas producing apparatus comprising a casing having an opening at one end and a closure for such opening, and having a fuel and air inlet and a gas outlet at other points, means for heating the interior of said casing, and a gasifying body of earthy nature within said casing and along which the fuel, and gas formed therefrom, will pass in passing from said inlet to said outlet, said gasifying body removable through the opening at the end of said casing.

6. Gas producing apparatus comprising a casing having an opening at one end and a closure for such opening, and having a fuel and air inlet and a gas outlet at other points, means for heating the interior of said casing, and a plurality of gasifying bodies of earthy nature within said casing and located one within another, forming, with said casing, a zigzag passage through which the fuel, and gas formed therefrom, will pass in passing from said inlet to said outlet, said gasifying bodies removable through the opening at the end of the casing.

7. Gas producing apparatus comprising a casing having a fuel and air inlet and a gas outlet, means for heating the interior of said casing, and gasifying means within said casing and along which the fuel, and gas formed therefrom, will pass in passing from said inlet to said outlet, comprising a tube, and a plurality of baffles within said tube the said fuel and air inlet being located opposite an intermediate point of the length of said tube, and arranged to direct the entering fuel and air against the side of such tube, and thereby to cause such entering current to flow along such tube in both directions from the point of inlet toward the ends of said tube.

8. Gas producing apparatus comprising a casing having an opening at one end and a closure for such opening, and having a fuel and air inlet and a gas outlet at other points, means for heating the interior of said casing, and gasifying means within said casing and along which the fuel, and gas formed therefrom, will pass in passing from said inlet to said outlet, comprising a tube, and a plurality of baffles within said tube, said gasifying means removable through the opening at the end of said casing the said fuel and air inlet being located opposite an intermediate point of the length of said tube, and arranged to direct the entering fuel and air against the side of such tube, and thereby to cause such entering current to flow along such tube in both directions from the point of inlet toward the ends of said tube.

9. Gas producing apparatus comprising a casing having an opening at one end and a closure for such opening, and having a fuel and air inlet and a gas outlet at other points, means for heating the interior of said casing, and gasifying means within said casing comprising tubes one within another, and forming a zigzag passage through which the fuel and gas formed therefrom, will pass in passing from said inlet to said outlet, the outer tube spaced away from the sides of the said casing, the inner tube supported by said end closure and spaced away from the sides of said outer tube.

10. Gas producing apparatus comprising a casing having an opening at one end and a closure for such opening, and having a fuel and air inlet and a gas outlet at other points, means for heating the interior of said casing, and gasifying means within said casing comprising tubes one within another, and forming a zigzag passage through which the fuel and gas formed therefrom, will pass in passing from said inlet to said outlet, the outer tube supported on and spaced away from the sides of the said casing, the inner tube supported by said end closure and spaced away from the sides of said outer tube, said gasifying means removable through the opening at the end of said casing.

11. Gas producing apparatus comprising a casing having, at a point intermediate its ends, a fuel and air inlet, and having also a gas outlet, and having within it a gasifying body spaced away from the sides of said casing, said fuel and air inlet located opposite an intermediate portion of said gasifying body, and arranged to direct the entering fuel and air toward said body, said gasifying body forming with said casing a lengthy passage extending in both directions from said inlet, through which the fuel, and the gas formed therefrom, will pass in passing from said inlet to said outlet, said apparatus further comprising means for heating the contents of said casing.

12. Gas producing apparatus comprising a casing having, at a point intermediate its ends, a fuel and air inlet, and having also a gas outlet, and having within it gasifying means comprising a plurality of tubes one within another spaced away from the sides of said casing and from each other, and forming with said casing a zigzag passage extending in both directions from said inlet, through which the fuel, and the gas formed therefrom, will pass in passing from said inlet to said outlet, said fuel and air inlet arranged to direct the entering fuel and air toward an intermediate point of one of said tubes, said apparatus further comprising means for heating the contents of said casing.

13. Gas producing apparatus comprising a casing having, at a point intermediate its ends, a fuel and air inlet, and having also a gas outlet, and having within it gasifying means comprising a plurality of tubes one within another spaced away from the sides of said casing and from each other, and forming with said casing a zigzag passage extending in both directions from said inlet, through which the fuel, and the gas formed therefrom, will pass in passing from said inlet to said outlet, and baffles within the inner of said tubes, said fuel and air inlet arranged to direct the entering fuel and air toward an intermediate point of one of said tubes, said apparatus further comprising means for heating the contents of said casing.

14. Gas producing apparatus comprising a casing having, at a point intermediate its end, a fuel inlet, and having also a gas outlet, and having within it gasifying means comprising tubes located one within another and spaced away from the sides of said casing and from each other, and forming with said casing a zigzag passage extending in both directions from said inlet, through which the fuel, and the gas formed therefrom, will pass in passing from said inlet to said outlet, the ends of said casing having end pieces provided with inwardly projecting supporting means supporting the inner of said tubes, said apparatus further comprising means for heating the contents of said casing.

15. Gas producing apparatus comprising a casing having, at a point intermediate its end, a fuel inlet and having also a gas outlet, and having within it gasifying means comprising tubes located one within another and spaced away from the sides of said casing and from each other, and forming with said casing a zigzag passage extending in both directions from said inlet, through which the fuel, and the gas formed therefrom, will pass in passing from said inlet to said outlet, and end plates fitting into the ends of said casing and supported thereby and provided with inwardly projecting supporting means supporting the inner of said tubes, said apparatus further comprising means for heating the contents of said casing.

16. Gas producing apparatus comprising a casing having, at a point intermediate its ends, a fuel inlet, and having also near its ends gas outlets, a plurality of tubes within said casing and spaced away from the walls thereof and from each other, and forming with said casing a zigzag passage extending in both directions from said inlet, through which the fuel, and the gas formed therefrom, will pass in passing from said inlet to said outlet, the innermost of said tubes having openings near its center connecting its interior space with such zigzag passage and causing said interior space to form a portion of such zigzag passage, said tubes removable through an opening at one end of said casing, a closure for such open end, plates fitting into the ends of said casing and supported thereby, and provided with inwardly projecting means for supporting the innermost of said tubes, and provided with gas outlet ducts connected to the gas outlets of said casing; said apparatus further comprising means for heating the contents of said casing.

17. Gas producing apparatus comprising a casing having, at a point intermediate its ends, a fuel inlet, and having also near its ends gas outlets, a plurality of tubes within said casing and spaced away from the walls thereof and from each other, and forming with said casing a zigzag passage extending in both directions from said inlet, through which the fuel, and the gas formed therefrom, will pass in passing from said inlet to said outlet, the innermost of said tubes having openings near its center connecting its interior space with such zigzag passage and causing said interior space to form a portion of such zigzag passage, baffles within said inner tube, said tubes removable through an opening at one end of said casing, a closure for such open end, plates fitting into the ends of said casing and supported thereby and provided with inwardly projecting means for supporting the innermost of said tubes, and provided with gas outlet ducts connected to the gas outlets of said casing; said apparatus further comprising means for heating the contents of said casing.

18. Gas producing apparatus comprising a casing having, at a point intermediate its length, a fuel inlet connection, and having within it a body of porous material opposite such inlet connection and extending in both directions therefrom, against which the incoming fuel will impinge, said casing having also an outlet, and a heating jacket surrounding said casing and provided with connections for the passage of a heating gas therethrough.

19. Gas producing apparatus comprising a casing having, at a point intermediate its length, a fuel inlet connection, and having within it a body of porous material opposite such inlet connection and extending in both directions therefrom, against which the incoming fuel will impinge, said casing having also an outlet, a heating jacket surrounding said casing and provided with connections for the passage of a heating gas therethrough, and an air heating jacket surrounding said first mentioned heating jacket and provided with an air inlet and with an air outlet connected to the fuel inlet of the apparatus.

20. Gas producing apparatus comprising a casing having at a point intermediate its ends, a fuel inlet, and having within it a body of porous material extending in both directions from said fuel inlet, and along which the entering fuel will pass, said casing having also an outlet, a mixing valve connected with said inlet, a heating jacket surrounding said casing and provided with connections whereby a heating gas may be circulated through said jacket, and an air heating jacket surrounding said first mentioned jacket and provided with an air inlet and with an air outlet, the latter connected to the mixing valve.

21. Gas producing apparatus comprising a tubular casing, gasifying material within the same, plates closing the ends of said casing, a jacket surrounding said casing, rings mounted on the ends of said casing and secured to said jacket, and closing the ends of the jacket space, and end plates covering the plates closing the ends of the casing, and the said rings; said casing having a fuel inlet and a gas outlet.

22. Gas producing apparatus comprising a tubular casing, gasifying material within the same, plates closing the ends of said casing, a jacket surrounding said casing, rings mounted on the ends of said casing and secured to said jacket, and closing the ends of the jacket space, a further jacket surrounding said first mentioned jacket and spaced therefrom by said rings, and end plates covering the plates closing the ends of the casing, and the said rings; said casing having a fuel inlet and a gas outlet.

23. The combination of gas producing apparatus comprising means for the conversion of liquid fuel into gas by partial combustion, and further comprising temperature operated means, influenced by the temperature of said apparatus, and means controlled by said temperature operated means for controlling the temperature of said apparatus.

24. The combination of gas producing apparatus comprising means for the conversion of liquid fuel into gas by partial combustion, and provided with heating means, and further comprising temperature operated means, influenced by the temperature of said apparatus, and means controlled by said temperature operated means controlling said heating means.

25. The combination of gas producing apparatus comprising means for the conversion of liquid fuel into gas by partial combustion, and provided with a heating chamber having connections for the flow of a heating fluid therethrough, and further comprising temperature operated means influenced by the temperature of said apparatus, and means operated thereby controlling the flow of heating fluid through said heating chamber.

26. Gas producing apparatus comprising means for the conversion of liquid fuel into gas by partial combustion, and having a heating chamber provided with connections for the flow of heating fluid through said chamber, and by-pass valve, said apparatus further comprising a thermostat controlled by the temperature of said apparatus and operating said by-pass valve.

27. Gas producing apparatus comprising a casing and means within the casing for the conversion of liquid fuel into gas by heat, said apparatus further provided with heating means and controlling means therefor, and means actuated by the expansion of the casing connected to said controlling means and arranged to operate the same.

28. The combination of gas producing apparatus comprising a casing and means within it for the conversion of liquid fuel into gas by heat, said apparatus provided with heating means and controlling means therefor, an arm pivoted to said casing, and connected to said controlling means, and a member less exposed to the heat of the apparatus than is said casing, and therefore having a different rate of expansion with changes of temperature of the apparatus than has said casing, said member connected to the pivoted arm and also to the casing at a point distant from the connection of said pivoted arm to the casing, whereby said controlling means is operated by variation of temperature in the apparatus.

In testimony whereof I have signed this specification in the presence of two subscribing witnesses.

ARTHUR M. STANLEY.

Witnesses:
H. M. MARBLE,
PAUL H. FRANK.